(12) United States Patent
Schildbach et al.

(10) Patent No.: US 6,421,802 B1
(45) Date of Patent: Jul. 16, 2002

(54) METHOD FOR MASKING DEFECTS IN A STREAM OF AUDIO DATA

(75) Inventors: Wolfgang Schildbach, Nürnberg; Jürgen Herre, Buckenhof; Martin Sieler, Lauf; Karlheinz Brandenburg, Erlangen; Heinz Gerhäuser, Waischenfeld, all of (DE)

(73) Assignee: Fraunhofer-Gesellschaft zur Forderung der angewandten Forschung e.V. (DE)

( * ) Notice: Subject to any disclaimer, the term of this patent is extended or adjusted under 35 U.S.C. 154(b) by 0 days.

(21) Appl. No.: 09/331,697

(22) PCT Filed: Mar. 13, 1998

(86) PCT No.: PCT/EP98/01487

§ 371 (c)(1),
(2), (4) Date: Jun. 23, 1999

(87) PCT Pub. No.: WO98/48531

PCT Pub. Date: Oct. 29, 1998

(30) Foreign Application Priority Data

Apr. 23, 1997 (DE) ............................. 197 17 133
Aug. 18, 1997 (DE) ............................. 197 35 675

(51) Int. Cl.$^7$ .......................................... G10L 19/00
(52) U.S. Cl. ................................................. 714/747
(58) Field of Search ........................................ 714/747

(56) References Cited

U.S. PATENT DOCUMENTS

| | | | |
|---|---|---|---|
| 5,025,404 A | | 6/1991 | Janssen et al. .............. 708/290 |
| 5,148,487 A | * | 9/1992 | Nagai et al. .................. 381/46 |
| 5,550,543 A | * | 8/1996 | Chen et al. ................... 341/94 |
| 5,598,506 A | * | 1/1997 | Wigren et al. ............. 395/2.42 |
| 5,699,485 A | * | 12/1997 | Shoham ..................... 395/2.32 |
| 5,907,822 A | | 5/1999 | Prieto, Jr. .................... 704/202 |
| 5,909,467 A | * | 6/1999 | Tae ............................. 375/253 |

FOREIGN PATENT DOCUMENTS

| | | |
|---|---|---|
| DE | 4111131 | 10/1992 |
| DE | 4208995 | 9/1993 |
| DE | 19640825 | 9/1997 |
| EP | 0574288 | 12/1993 |
| EP | 0591842 | 4/1994 |
| EP | 0609300 | 8/1994 |

OTHER PUBLICATIONS

Wong et al., "Estimation of Unreliable Packets in Subband Coding of Speech", IEE Proceedings–I, vol. 138, No. 1, Feb. 1991, pp. 43–49.*

Herre, et al., "Analysis Tool for Realtime Measurements Using Perceptual Criteria", Data base Inspec Institute of Electrical Engineers Stevenage, GB.

Stoll et al., "Mascam: Miinmale Datenrate Durch Berucksicktigung Der Gehoreigenschaften Dei Der Codierung Hochwertiger Tonsignale" 11, Nov. 1988, Fernseh Und Kinotechnik, Heidelberg, DE.

Wiese, "Anwendung von Fehlerverschlelerungstechniken fur digitalen Horrundfunk" 20, Feb., 1992.

J. Herre, "Fehlerverschleierung bei spektral codierten Audiosignalen", 1995, Der Technischen Fakultat der Universitat Erlangen–Nurnberg.

D. Wiese, "Error Concealment Strategies for Digital Audio Broadcasting", Mar. 1992, Institue fur Rundfunktechnik GmbH., Munchen, Germany.

Filliat, et al., "Error Correction by Interpolation in Digital Audio", Mar. 1992, Pre–Rouge, Saint Oyens, Switzerland.

* cited by examiner

Primary Examiner—Stephen M. Baker
(74) Attorney, Agent, or Firm—Beyer Weaver & Thomas, LLP

(57) ABSTRACT

In a method for concealing errors in an audio data stream the occurrence of an error is detected in the audio data stream, audio data prior to the occurrence of the fault being intact audio data. Thereafter a spectral energy of a subgroup of the intact audio data is calculated. After forming a pattern for substitute data on the basis of the spectral energy calculated for the subgroup of the intact audio data, substitute data for erroneous or missing audio data which correspond to the subgroup are created on the basis of the pattern.

15 Claims, No Drawings

METHOD FOR MASKING DEFECTS IN A STREAM OF AUDIO DATA

FIELD OF THE INVENTION

The present invention relates to audio coding methods and in particular to error concealment techniques in the coding of audio signals.

BACKGROUND OF THE INVENTION

The so-called "Internet Radio Broadcasting", i.e. the transmission of a radio programme live over the Internet, entails the buildup of thousands of realtime connections between a transmitter and receiver programs, which are located e.g. in a personal computer of an Internet subscriber.

The currently most widely distributed Internet protocol http ensures an error-free transmission but does not possess any realtime properties. This protocol involves a network load at the transmitter which is proportional to the number of stations received. This means that the number of simultaneous listeners is typically limited to a few hundred, depending on the data rate of the coded signals, which is certainly not sufficient for "broadcasting applications", i.e. applications in which radio or television signals are to be transmitted.

New protocols for transmitting data over the Internet, such as e.g. rtp (rtp=realtime transmission protocol), avoid this bottleneck in that, unlike the protocol http, they permit errors in the transmission.

This raises the problem for the receiver as to how it is to deal with erroneous transmission data. How will e.g. the abscence of parts of a multimedia or audio data stream be bridged?

DESCRIPTION OF PRIOR ART

Some methods for error management are already known in the prior art. In the method of mute switching, which is the simplest type of error concealment, the reproduction is switched off as long as data are missing or erroneous. The missing data are replaced by a null signal. Because of psychoacoustic effects, this sudden fall off and rise in the signal energy is felt to be very unpleasant. A mute switching method is described e.g. in Detlef Wiese: "Error Concealment Strategies for Digital Audio Broadcasting", 92$^{th}$ AES Convention, Wien 1992, Preprint 3264, and in Detlef Wiese: "Anwendung von Fehlerverschleierungstechniken für digitalen Hörrundfunk (DAB)", 9$^{th}$ ITG-Fachtagung "Hörrundfunk", Mannheim 2/92.

Another known method is the method of data repetition. If a data stream ceases, a part of the data transmitted last is repeated in a loop. In block-oriented methods, which constitute the majority of known audio coding methods, the block or blocks transmitted last would be repeated for example. Such a method is known from the literature sources already cited.

This method leads to annoying secondary manifestations or artefacts, however: if only short parts of the audio signal are repeated, the repeated signal—whatever the original signal may be—sounds machinelike with a fundamental frequency at the repetition frequency. If longer parts are repeated, "echo effects" result, which are also felt to be annoying.

A further method, the method of data interpolation, is based on the probability that, when a data stream is transmitted with relatively high delay, valid audio data are already present again if an error gap of the audio data signal has to be concealed. An interpolation can be used to generate data in the gap, as described in Laurent Filliat, Mario Rossi, Joseph Maisano, "Error Correction by Interpolation in Digital Audio", 92. AES Convention, Wien 1992, Preprint 3281.

A disadvantage of this method is e.g. that the delay is unacceptable in many cases, in particular in connection with telephony applications.

In block-oriented transform coders/decoders the signal energy per spectral line can be predicted or "predicated" from one block to the next. This known method (Jürgen Herre: "Fehlerverschleierung bei spektral codierten Audiosignalen", Dissertation, Universität Erlangen-Nürnberg, Erlangen 1995) does indeed result in good error concealment, but a relatively high computational effort is required which makes a realtime decoding of a received multimedia or audio data signal impossible at the present time.

Also known in the technological field is the practice of increasing the redundancy in the data stream. It is possible to introduce into an audio data stream at the outset, in the coder or transmitter, a second data stream which transmits the same signal (possibly with a lower data rate and correspondingly lower quality). If this second data stream is displaced in time relative to the first, it is probable that at each moment valid data will be received from at least one of the two streams. The loss of one signal can thus be bridged by the other signal. In the case of an erroneous main signal this method provides a true reproduction of the information which, however, will normally be of worse quality.

As does the previous method, this method increases the delay between transmitter and receiver, so that the same disadvantages result as in the case of data interpolation. Furthermore, the data rate is increased, since a second, to some extent identical signal is transmitted, which cannot be acceptable especially at low data rates or low available transmission bandwidths.

For the transmission of a stereo signal there exists a further method for concealing errors in the transmission. In the method of left/right replacement the disturbed or failed channel can be replaced by the respective other channel as is described in Detlef Wiese: "Error Concealment Strategies for Digital Audio Broadcasting", 92. AES Convention, Wien 1992, Preprint 3264, Detlef Wiese: "Anwendung von Fehlerverschleierungstechniken für digitalen Hörrundfunk (DAB)", 9. ITG-Fachtagung "Hörrundfunk", Mannheim 2/92, and Jürgen Herre: "Fehlerverschleierung bei spektral codierten Audiosignalen", Dissertation, Universität Erlangen-Nürnberg, Erlangen 1995. In general, however, the data for both channels are transmitted simultaneously and are therefore disturbed at the same time. Otherwise what is involved here is a special case of the method for increasing the redundancy in the data stream. This method can, moreover, only be adopted when the left and the right channel can be decoded independently of one another. This is not possible, however, for the so-called "joint stereo" modes, which are defined by the Standard MPEG Layer 3, for instance.

SUMMARY OF THE INVENTION

It is the object of the present invention to provide a method for concealing errors in an audio data stream that attains an effective error concealment and that is as inaudible as possible.

This object is achieved by a method for concealing errors in an audio data stream, comprising the steps of detecting the occurrence of an error in an audio data stream, the audio data prior to the occurrence of the error being intact audio data; calculating a spectral energy of a subgroup of the intact audio data; forming a pattern for substitute data on the basis of the spectral energy calculated for the subgroup of the intact audio data; and creating substitute data for erroneous or missing audio data which correspond to the subgroup on the basis of the pattern.

A subgroup in the sense of this application always comprises several sequential frequency lines. The frequency domain is thus divided into sequential subgroups, each subgroup having sequential frequency lines. Preferably the subgroups can correspond to the frequency groups known from the field of psychoacoustics. It is also possible to choose a division for the subgroups which differs from the frequency groups, however, as will be described later.

As will become clear from the later detailed description, this method overcomes disadvantages occurring in the prior art since it neither requires an increased delay nor an increase in the data rate, i.e. a change in the source coding, nor exibits the unattractive time and frequency structure of a simply repeated signal section. In contrast e.g. to the method of spectral prediction, which has already been touched on, the method according to the present invention provides a hearing-adjusted noise substitution. The starting point is a temporal audio signal frequency representation which can be obtained in many ways which are known to persons skilled in the art. As has been explained by Zwicker and Fastl in "Psychoacoustics, Facts and Models", 1990, the spectrum of a signal can be grouped into so-called frequency groups. This leads to a scaling of the frequency axis in Barks which takes hearing-relevant properties into account, in contrast to a customary scaling of the frequency axis in Hertz, which does not. A Bark is the frequency difference between neighbouring frequency groups. A frequency group as defined by Zwicker is the maximum bandwidth within which the intensities of individual tones are summed by the human ear so as to form hearing thresholds.

The present invention is based on the finding that for an error concealment it suffices to create a random signal with a "good" spectral form. "Good" in this context means that the spectral energies in frequency groups of the random signal match the spectral energies of the intact audio data prior to the occurrence of the error or are derived from the same.

Before considering various embodiments of the present invention, other concepts which are important for understanding the invention will be explained briefly.

When the "spectral energy" of a frequency line is referred to in this application this is to be understood as the square of the magnitude of this spectral component, calculated e.g. by means of a Fourier transform. When, on the other hand, reference is made to the "spectral energy" of a subgroup, this is to be understood as the sum of the squared magnitudes of the spectral components in this subgroup, which have been calculated e.g. by a Fourier transform. It is important, however, to note that the term "spectral energy" is not used completely strictly. If e.g. the method according to the present invention is implemented in a coder which operates according to MPEG Layer 3, the method proceeds on the basis of MDCT lines (MDCT=modified discrete cosine transform). The modified discrete cosine transform used there, which involves overlapping and windowing, is not, however, energy conserving in the strict sense. This means that there is no simple way of finding the energy per frequency line, in the sense e.g. of a Fourier transform, from MDCT spectra. Conversely, when this energy is known, it is not a simple matter to create an MDCT spectrum which contains the required energy. The term "spectral energy" thus refers both to the energy conserving Fourier transform and to the "not" energy conserving modified discrete cosine transform or to similar nonenergy-conserving transform methods which are known. The usefulness of the method according to the present invention does not depend on an exact conservation of energy, however, since the method for concealing errors in an audio data stream is concerned not with an exact reconstruction of the original data, which is normally not possible, but with an estimation of substitute data which result in an error which has occurred being as inaudible as possible and thus concealed.

Furthermore, audio data prior to the occurrence of an error or intact audio data will often be spoken of in this application. It should be noted that these expressions do not refer to the actual receiving process of e.g. a program reading from the Internet. With some Internet protocols, data packets which are dispatched sequentially may arrive in a different sequence. Thus if audio data prior to the occurrence of an error are spoken of, reference is not made here to the real time but to the sequence specified by the audio data stream. It should also be noted that audio data prior to the occurrence of an error could obviously have also been erroneous or missing at a still earlier time. If, however, an error is detected in an audio data stream, this means that intact audio data were certainly present prior to the occurrence of the error. This does not mean then that the method of the present invention can only handle the very first error in an audio data stream.

As has already been mentioned, the unexpected absence of audio data and also the presence of erroneous, i.e. partially destroyed, audio data are described as an error in this application. Thus, when erroneous audio data are replaced by substitute data, this means either that partially destroyed audio data are replaced by substitute data or that, at the place at which, unexpectedly, no audio data exist, substitute data are inserted.

When, moreover, it is stated in this application that spectral energies are calculated on the basis of intact audio data, this should not be taken to mean that the whole of the intact audio data between the current error and the last error are used. Instead, the quantity of intact audio data which represent the audio data stream prior to the occurrence of the error depends on the individual application. In embodiments of the present invention which operate on a block basis, the quantity of intact audio data might comprise e.g. only audio data of the last block or several last blocks. Furthermore, not all the intact audio data e.g. of a block need necessarily be used, but only e.g. audio data which have information on energies per subgroup. One of the strengths of the method of the present invention lies precisely in the fact that not necessarily all frequency lines must be stored and predicated in the event of an error. The more audio data that are used to form a pattern for substitute data, however, the more precisely can subsitute data be created from the spectral pattern in order to conceal an error.

DETAILED DESCRIPTION OF THE PREFERRED EMBODIMENTS

In the following the method according to the present invention will be explained illustratively in terms of an audio coding method which creates and transmits spectrally coded audio data. Most of the modern audio coding methods, such as e.g. MPEG Layer 1–3, MPEG AAC, Dolby AC-3, PAC, deliver spectrally coded audio data, which are received, decoded and converted back to the time domain by an appropriate decoder.

As is generally known, an analog signal to be coded is scanned at a suitable scanning frequency, e.g. 44.1 kHz, to obtain a discrete time signal. Such a discrete time signal can now be windowed using a suitable window function to obtain blocks with a certain number of individual time-discrete signal values, which are weighted particularly towards the boundaries of the blocks by the window function, as is generally known in the field of telecommunications. A block with time-discrete signals weighted by means of a window function is now transformed from the time domain into the frequency domain by means of a suitable transform method. Suitable transform methods may be a fast Fourier transform (FFT), a filter bank method or a modified discrete cosine transform (MDCT). After the transform a block of time-discrete signals exists as a block of frequency lines. The block of frequency lines or the frequency spectrum of the block of time-discrete signal values can now be quantized. Taking account of psychoacoustic considerations, it is possible in certain circumstances to fashion a quantization error introduced by the quantization in such a way that it is not audible, i.e. so that it lies below the threshold of hearing of the human ear.

In modern audio coding methods the spectral lines which now exist in quantized form are subjected to a redundancy reduction, e.g. by means of a Huffman coding, and are packed together with the page information needed for decoding in an audio data stream, which is now ready for transmission to a receiver.

It should be noted at this point that the term "audio data stream" in this application includes not only the audio data streams created as described previously but any form of audio data, whether coded or uncoded. Thus it is not necessary for the present invention that the audio data stream be subdivided into blocks of equal length or in blocks of any kind. If the audio data stream exists spectrally coded in block form, however, the method according to the present invention can be implemented with the least effort. If the audio data stream exists in some other form, the audio data can be prepared using known steps and methods so as to implement the method according to the present invention.

The method according to the present invention thus comprises four steps. The first step consists in detecting the occurrence of an error in an audio data stream, the second step and the third step consist in calculating a spectral energy of a subgroup in the audio data which represent the audio data stream prior to occurrence of the error, i.e. in the intact audio data, and then to form a pattern for substitute data on the basis of the spectral energies calculated for the subgroup of the intact audio data. The last step then consists in creating substitute data for erroneous or missing audio data on the basis of the pattern for the subgroup for which the pattern has been formed.

The first step consists then in detecting the occurrence of an error. If the input data stream goes missing or exhibits errors which can be detected using suitable devices e.g. for checking a checksum or something similar in a coded audio signal, a certain part of the data can e.g. be stored before this error occurs, e.g. in a ring buffer.

The method according to the present invention now calculates the spectral energy for each subgroup. While the known variant for linewise prediction typically requires 20 to 30 times the storage and computations compared to the method of the present invention (when the subgroups correspond to the frequency groups), the spectral energy for each subgroup according to the present invention can be calculated efficiently and economically. It should nevertheless be pointed out, however, that the cited storage and computational outlay applies only to the error concealment. The total complexity (storage or computation time) e.g. of a complete MPEG Layer 3 decoder does not normally increase very much. If, on the other hand, a linewise prediction is employed, the total computational outlay of the coder/decoder will indeed rise significantly.

The spectral energy per subgroup consists of the sum of the squares of the magnitudes of the spectral components in the subgroup. The spectral energy per subgroup thus corresponds to the sum of the squared lines in this subgroup. This is so both when using an MDCT and when using an FFT for the time-frequency transform to transform time-discrete audio signals into the frequency domain, as is customary for modern coders. Reference is made here, however, to the remarks made previously, that the MDCT, unlike the Fourier transform, is not exactly energy conserving.

The spectral energy of a subgroup is thus the basis for forming a pattern for substitute data. The substitute data should exhibit a "spectrally average" spectrum in the sense of the short time statistics. "Spectrally average" means that a part of such a signal when it is replaced according to the method of the present invention will not be particularly conspicuous, i.e. that the replacement is concealed.

For reasons of simplicity, the following description of the present invention is given in terms of a block-oriented method, as is the case for most of the modern audio coders. It is pointed out, however, that the present invention is not restricted to a block-oriented method. The prerequisite for the method is that information on the spectral composition of the signal can be obtained, so that the spectral energy per subgroup may be calculated therefrom. (This is naturally particularly easy for block-oriented transform codecs.)

For ascertaining the pattern, i.e. the short-time statistics, for substitute data, data received in the past (intact data) are used. In principle it would also be possible, after introducing a delay in the signal path, to use "future" data after an error and perform an interpolation. The disadvantage thereby lies, however, in the delay already mentioned. The method of the present invention does not employ an interpolation, however, but a prediction. It is possible to speak of prediction since the result of this operation is always a later-time spectrum which is derived from earlier-time data. Should an error occur, audio data prior to the occurrence of an error, i.e. intact audio data, are thus always used to insert artificially created substitute data in the place of erroneous data or in the place of missing data so as to conceal the error. Nevertheless, it should be pointed out that the term "prediction" is normally interpreted more restrictively in the literature. The formation of a pattern for substitute data on the basis of the spectral energy calculated for the subgroup of the intact audio data can be made more or less complicated and thus more or less exact.

For the individual methods described hereinafter, the following conventions are specified in advance. $X_i$ signifies the short-time spectrum, i.e. the vector of short-time spectral components, of a block i. $E_i(f)$ represents the spectral energy of a subgroup of the mid-frequency f in the block i. It should be kept in mind here that i=0 represents the block to be predicated, i.e. the block of substitute data, while negative i represent the stored blocks of the intact audio data and N corresponds to the number of stored blocks. $E_x(f)$ stands for the energy required by the pattern in the subgroup of the mid-frequency f.

The following methods for forming a pattern for substitute data, sorted in increasing order of complexity of calculation, can be regarded as suitable:

1. The spectral energies per subgroup of the block received last are used directly as the pattern for the missing block. This is expressed by the following equation:

$$E_V = E_{-1}$$

2. The pattern arises as a linear combination of powers of the spectral energies of corresponding subgroups of preceding blocks:

$$E_V(f) = \sum_{i=-1}^{-N} a_i E_i(f)^{b_i}$$

$a_i$ are constant coefficients of the linear combination, while $b_i$ are exponents for weighting the individual spectral energies. The simplest case here again is that of taking the average, which may be represented by the following coefficient values:

$$a_i = 1/N \text{ and } b_i = 1.$$

3. The pattern for the substitute data can also be obtained by forming the median over previous energies. This may be represented by the following equation:

$$E_v(f) = \text{median}\{E_i(f), i=-1 \ldots -N\}$$

Alternatively, the smallest, the second smallest, ..., the second largest or the largest element from the $E_i(f)$ could be used in forming the median.

4. The pattern for the substitute data on the basis of the spectral energy calculated for the subgroup of the intact audio data can, however, also be calculated by means of a linear adaptive prediction. This corresponds to the equation shown in the second case, though the equation must now have time-dependent coefficients $a_i(t)$. For this case energies lying in the future can also be calculated. A linear adaptive prediction for forming the pattern for substitute data is particularly advantageous if more than one block of data in the data stream are missing or have to be replaced.

It should be noted at this point that the preceding list for calculating a pattern for substitute data makes no claim to completeness. What is important is simply that the pattern for the substitute data of a subgroup is obtained from spectral energies of a certain number of preceding corresponding subgroups of intact audio data.

Now that a pattern for substitute data has been formed on the basis of the spectral energy calculated for the subgroup of the intact audio data, the last step of the method consists in creating the substitute data which are to be inserted, or substituted, in the audio data stream in place of erroneous or missing audio data.

Substitute data should be created that exhibit the same spectral energy per subgroup as the pattern for the substitute data. The fundamental method therefore consists in replacing erroneous or missing audio data, which in the final analysis will be spectral components, by artificially created spectral components. The boundary condition is thus that the artificially created spectral components in a subgroup together exhibit the same spectral energy as is given by the pattern. Various possibilities exist for this. For example, all the spectral values in a subgroup can be given the same value, the magnitude of the spectral values or frequency lines being given by the requirement that the spectral energy of the same corresponds to the corresponding spectral energy of the pattern.

A further possibility could consist in specifying from the outset a particular weighting, which could consist in attenuating spectral values at the boundary of a subgroup and emphasizing spectral values in the middle of a subgroup. The corresponding spectral values together must, however, have the same spectral energy as a corresponding subgroup of the pattern.

The preferred method for creating substitute data consists, however, in setting all the spectral components within a subgroup to uniformly distributed random values $X(f)$ between $-1$ and $+1$ and subsequently performing a scaling or normalization in which the level of the signal which has just been created is so increased/diminished that within each subgroup it has the spectral energy required by the pattern.

To achieve this, it is necessary, after creating the random signal X, to multiply each line $X(f)$, which by definition will have a value between $-1$ and $+1$, with the following quotient, which is also termed the normalization factor $\alpha$, within the corresponding subgroup:

$$\alpha = \sqrt{E_{V(fk)}} / \sqrt{\sum X(f)^2};$$

$f \in$ subgroup of the mid-frequency $f_k$

Here $E_V(f_k)$ represents the spectral energy in the pattern within a subgroup k of the mid-frequency $f_k$. $E_V(f_k)$ thus represents the pattern for the subgroup k with the mid-frequency $f_k$.

To simplify the foregoing requirement so as to be able to dispense with the summation in the denominator, a random signal can also be generated which contains uniformly distributed values between $+P$ and $-P$, where P must have the following value:

$$P = \sqrt{3 E_v(fk)}$$

The energy of this signal then lies, to a high degree of probability, close to the required energy $E_V(f_k)$. This is certainly true for subgroups containing a relatively large (approx. 10) number of frequency lines. This is because the mean square of uniformly distributed values between $-1$ and $+1$ is equal to $1/3$.

The substitute data or spectral components now created for the subgroup are processed by a decoder in just the same way as error-free data or spectral values. In view of the fact that the spectral energies of the subgroups in the artificially created data now correspond to the spectral energies of the subgroups in the last intact block or are derived from the spectral energies of subgroups of several preceding blocks, the block with artificially created substitute data or the blocks with artificially created substitute data will be inaudible if the signal statistics of the audio signal are approximately uniformly distributed. An error will thus be concealed.

In the method according to the present invention for concealing errors in an audio data stream inconstant signals may cause problems since a block with statistics which are atypical for the signal may possibly be used as the basis for the substitution. To prevent a block with atypical statistics which is followed directly by an erroneous block dominating the formation of a pattern for substitute data for the erroneous block, whereby audible errors could be introduced, it can prove advantageous to store not just the last intact block but several immediately preceding intact blocks and to use them for a just cited prediction so as to obtain a pattern for substitute data which takes account of the longer term tendency of the signal behaviour or of the signal statistics and not just the statistics or behaviour of a single block.

If the undisturbed or intact signal or the undisturbed or intact audio data stream contains a prominent or exceptional spectral component which lies near the boundary of a subgroup, a noise which is uniformly distributed within the subgroup ("white" noise) and which is generated by the method just described is experienced with a different tone level, namely the mid-frequency of the subgroup. To avoid this effect, narrow subgroups, possibly with a width of only one frequency line, should be chosen in frequency ranges in which the ear is sensitive to such tone level variations. For a width of only one frequency line, the method becomes simpler since—instead of calculating with the square of the magnitude of the spectral component of the pattern—the spectral component of the pattern can be multiplied directly with a number chosen at random from (+1, −1).

What is claimed is:

1. Method for concealing errors in an audio data stream, the audio data stream having audio data that include a group of spectral lines, the group of spectral lines spectrally representing a block of successive audio samples, comprising the following steps:

detecting an occurrence of an error in the audio data stream, wherein audio data in the audio data stream before the occurrence of the error are intact audio data;

calculating a spectral energy of a subgroup of the intact audio data, the subgroup including a plurality of spectral lines;

forming a pattern for substitute spectral lines on the basis of the spectral energy calculated for the subgroup of the intact audio data, the pattern being a measure for a spectral energy of the substitute spectral lines; and creating substitute spectral lines for erroneous or missing spectral lines which correspond to the subgroup, on the basis of the pattern.

2. Method according to claim 1, wherein the audio data stream comprises successive data blocks, a data block comprising audio data which correspond to a certain temporal block duration;

wherein spectral energies for each subgroup of a last intact data block are calculated when an erroneous data block is encountered; and wherein the pattern for substitute spectral lines for each subgroup of the erroneous data block comprises the spectral energy of the corresponding subgroup of the last intact data block.

3. Method according to claim 1, wherein the step of creating substitute data comprises the following steps:

setting the set plurality of spectral lines within a subgroup to uniformly distributed random values between −1 and +1; and scaling the set spectral lines in such a way that the spectral energy of the set spectral lines of the subgroup is the same as the pattern.

4. Method according to claim 1, wherein the following steps are performed prior to detecting the occurrence of an error in an audio data stream:

receiving the audio data stream; and storing, in a sequence specified by the audio data stream, at least the data of the audio data stream which were received last chronologically.

5. Method according to claim 1, wherein the audio data stream comprises successive data blocks, a data block comprising audio data which correspond to certain temporal block duration;

wherein spectral energies for corresponding subgroups of at least two preceding intact data blocks are calculated when an erroneous data block is encountered; and wherein the pattern for substitute spectral lines for each subgroup of the erroneous data block is ascertained by prediction from the corresponding subgroups of the at least two preceding intact data blocks.

6. Method according claim 5, wherein the pattern represents the result of a linear combination of powers of the spectral energies of corresponding subgroups of the preceding intact data blocks.

7. Method according to claim 5, wherein the represents the result of an averaging over the spectral energies of corresponding subgroups of the preceding intact data blocks.

8. Method according claim 5, wherein the pattern results from forming a median over the spectral energies of corresponding subgroups of the preceding intact data blocks.

9. Method according to claim 5, wherein the pattern results from a linear adaptive prediction over the spectral energies of corresponding subgroups of the preceding intact data blocks.

10. Method for concealing errors in an audio data stream, comprising the following steps:

detecting an occurrence of an error in the audio data stream, wherein audio data in the audio data stream before the occurrence of the error are intact audio data;

calculating a spectral energy of a subgroup of the intact audio data;

forming a pattern for substitute data on the basis of the spectral energy calculated for the subgroup of the intact audio data; and creating substitute data for erroneous or missing audio data which correspond to the subgroup on the basis of the pattern, wherein the audio data stream comprises successive data blocks, a data block comprising audio data which correspond to certain temporal block duration, wherein spectral energies for corresponding subgroups of at least two preceding intact data blocks are calculated when a erroneous data block is encountered, and wherein the substitute data for each subgroup of the erroneous data block are ascertained by prediction from the corresponding subgroups of at least the two preceding intact data blocks.

11. Method according claim 10, wherein the pattern represents the result of a linear combination of powers of the spectral energies of corresponding subgroups of the preceding intact data blocks.

12. Method according to claim 10, wherein the pattern represents the result of an averaging over the spectral energies of corresponding subgroups of the preceding intact data blocks.

13. Method according claim 10, wherein the pattern results from forming a median over the spectral energies of corresponding subgroups of the preceding intact data blocks.

14. Method according to claim 10, wherein the pattern results from a linear adaptive prediction over the spectral energies of corresponding subgroups of the preceding intact data blocks.

15. Method for concealing errors in an audio data stream, comprising the following steps:

detecting an occurrence of an error in the audio data stream, wherein audio data in the audio data stream before the occurrence of the error are intact audio data;

calculating a spectral energy of a subgroup of the intact audio data,;

forming a pattern for substitute data on the basis of the spectral energy calculated for the subgroup of the intact audio data; and creating substitute data for erroneous or missing audio data which correspond to the subgroup on the basis of the pattern, wherein the step of creating substitute data comprises setting the set audio data within a subgroup to uniformly distributed random values between −1 and +1 and scaling the set audio data in such a way that the spectral energy of the set audio data of the subgroup is the same as the pattern for the substitute data for the subgroup of the intact audio data.

* * * * *